United States Patent
Burd et al.

(10) Patent No.: US 6,874,041 B1
(45) Date of Patent: Mar. 29, 2005

(54) AUTOMATIC CONFIGURATION OF COMMUNICATION DEVICE INPUT OR OUTPUT TERMINAL

(75) Inventors: Nick Burd, Irvine, CA (US); Yong H. Song, Irvine, CA (US); Jennifer C. Yang, Laguna Niguel, CA (US); Hilburn Ross Williams, Madison, AL (US)

(73) Assignee: Conexant Systems, Inc., Newport Beach, CA (US)

( * ) Notice: Subject to any disclaimer, the term of this patent is extended or adjusted under 35 U.S.C. 154(b) by 385 days.

(21) Appl. No.: 09/588,830

(22) Filed: Jun. 7, 2000

(51) Int. Cl.⁷ ............................ G06F 3/00; G06F 15/16
(52) U.S. Cl. .............................. 710/38; 710/36; 710/8; 710/14; 710/15; 710/16; 709/250; 709/227; 709/228
(58) Field of Search ................................ 370/216–271; 379/90.01–108.02; 709/220–224, 250, 227, 228; 710/36, 38, 15, 16, 8, 14

(56) References Cited

U.S. PATENT DOCUMENTS

| | | | | |
|---|---|---|---|---|
| 4,831,617 A | * | 5/1989 | Iwasaki | 370/217 |
| 5,018,189 A | * | 5/1991 | Kurosawa et al. | 379/93.01 |
| 5,185,783 A | * | 2/1993 | Takahashi et al. | 379/93.09 |
| 5,193,086 A | * | 3/1993 | Satomi et al. | 370/228 |
| 5,590,171 A | * | 12/1996 | Howe et al. | 379/33 |
| 6,085,245 A | | 7/2000 | Kaycee et al. | |
| 6,175,865 B1 | * | 1/2001 | Dove et al. | 709/220 |
| 6,188,669 B1 | | 2/2001 | Bellenger | |
| 6,466,251 B1 | * | 10/2002 | Troibner et al. | 370/260 |

* cited by examiner

Primary Examiner—Jeffrey Gaffin
Assistant Examiner—Joshua D Schneider
(74) Attorney, Agent, or Firm—Farjami & Farjami LLP

(57) ABSTRACT

A method and apparatus is disclosed for the automatic configuration of a communication input /output port or terminal on a communication device. The communication device comprises one or more input/output ports or terminals, one or more switching devices, some form of switch device controller, and one or more communication circuitry, configured to facilitate communication with a remotely located communication terminal. The one or more input/output ports or terminals of the communication device connect to one or more communication cables or wires configured to transfer data with the remotely located communication terminal. In one configuration the communication cables comprise two twisted pair wires as is commonly installed for telephone communication and utilized for DSL communication service. To achieve automatic configuration, the switching device is initially set in a default position connecting the communication circuitry to at least one of the communication cables. Thereafter, the communication circuitry monitors for enablement of the communication service on the communication cables connected to the communication circuitry. If the service is detected the process is complete. If the communication circuitry does not detect the communication service, the switch controller forces the switching device to connect the communication circuitry to another of the communication cables. This process repeats. Alternative embodiments include communication circuitry configured to support more than one communication standard and communication devices incorporating a low pass filter to achieve pass-through voice communication.

32 Claims, 13 Drawing Sheets

AUTOMATIC CONFIGURATION OF COMMUNICATION DEVICE INPUT OR OUTPUT TERMINAL

FIELD OF THE INVENTION

The invention relates to data communications and in particular to the field of auto-configuration of input/output ports on communication devices.

BACKGROUND OF THE INVENTION

The combination of the popularity of on-line content and the affordability of data communication equipment has lead to a proliferation of data communication equipment within homes and businesses throughout the world. This equipment allows users of the data communication equipment to exchange data with remote computers, terminals and individuals. Initially the on-line content was limited to dial-up bulletin board systems (BBS). Today however, these BBS systems have grown into a worldwide network of computers linked by a complex network or web of data communication media. The Internet is a popular example of a worldwide network of computers and data communication media.

Historically, the majority of individuals accessing on-line content utilized a communication device, such as a modem, linked to standard twisted pair communication wire as universally utilized for voice communication between a central office and a termination in a home or business. This path is often referred to as the local loop. Analog modem technology has traditionally been utilized to enable communication between the user's computer and the remote terminal. Examples of analog modem technology for the purposes of this discussion include the V0.34 standard and the V0.90 standard.

The popularity of on-line access has created a corresponding demand by users to more rapidly obtain the information from remote computers or terminals. Emerging from the demand for faster access to the on-line content, numerous different technologies have been proposed to provide greater bandwidth to the user or make better utilization of the bandwidth available to the user. These various technologies include technologies commonly referred to as digital subscriber line (DSL), Integrated Services Digital Network (ISDN), cable modems, and fiber optic links.

Of all the proposed new technologies, DSL appears to be the most promising because DSL technology is able to utilize standard copper twisted pair wire as its communication media between the point of termination (home or business) and the access to the world wide computer network (hereinafter Internet). DSL technology is able to overcome the drawbacks and enable high-speed communication on existing local loop media.

As further evidence of the popularity of accessing on-line content, many homes and business are utilizing more than one standard for data communication or more than one communication media or access path. For example, some homes and business utilized both DSL technology and standard analog technology, such as the V0.34 standard or the V0.90 standard.

While the use of multiple communication paths and various communication standards is a convenient and valuable asset when all services are properly installed and in operation, the process of installation and configuration has historically been problematic.

Moreover, it is desirable for companies to manufacture a single device designed to be shipped worldwide that facilitates communication under more than one communication standard or technology. For example, it is desirable to manufacture a device capable of DSL operation and analog modem operation. While manufacturing a single device having worldwide capability reduces production costs, it requires that the communication device have capability to operate under the various standards and communication media as found in countries other than the United States.

Numerous problems or drawbacks emerge at the time of installation (or reinstallation) and initial configuration (or re-configuration) for such a device. In the case of a communication device having capability for operation under more than one standard and which is equipped with more than one input/output jack, the user may become confused as to which input/output connector to insert into which input/output jack on the device.

Another drawback associated with use of a single device in various locations arises from the provisioning of the DSL service. Traditionally, there are four to six conductors on each wire set that have traditionally been utilized for voice communication within homes and businesses. As is commonly understood, these conductors may be terminated with a RJ-11 jack having an inner pair of conductors and an outer pair of conductors. Different entities within the U.S. and countries other than the U.S. utilize different conductors for newly installed DSL service. Hence, communication devices of the prior art had to be manufactured for each specific DSL provisioning system at each particular location, or the site had to be rewired.

These undesirable drawbacks in the prior art systems resulted in events, which reduced customer satisfaction, increased costs, and hindered system performance. For example, if a user was unable to configure their device, or if the device was not accurately configured for a particular location, the communication device would often be returned for a refund, the DSL or other new service canceled, or a service technician dispatched to assist in the installation process. These events are all undesirable. The inventors of the invention discovered and comprehended these drawbacks, appreciated the need arising from their discoveries, and consequently have disclosed herein a method and apparatus to overcome these drawbacks of the prior art systems.

SUMMARY OF THE INVENTION

The invention provides a method and apparatus for the automatic configuration of the input/output terminals of a communication device. Automatic configuration of a communication device's input/output ports provides several advantages over the prior art. One advantage is that the automatic configuration feature simplifies the installation process by adapting to various service configurations. For example, the automatic configuration adapts the communication device to automatically operate with a service configuration supplying communication services on any of the available conductors. Thus, the initial installations is simpler, requires fewer steps, and is more likely to proceed without problems. This makes a device having the automatic configuration capability the product of choice. Moreover, the automatic configuration features reduce the need for a service technician to travel to the site to assist in the installation of the communication device. The result is more rapid, less costly installation. The automatic configuration feature will also reduce the number of service calls placed via a telephone to a help line. It has been determined that even telephone placed service calls cost twenty dollars to thirty dollars per call. Such additional cost decreases a product's or service's profitability.

This method and apparatus provides for operation on any various service configuration of the communication cable coupled to the communication device. To achieve automatic configuration, a communication device having at least one input/output port (or a separate input port and output port) is connected to a relay or other switching device. The input/output port is also commonly referred to in the art as a connector, terminal, jack, or I/O port.

Also connected to the switching device is communication circuitry configured to facilitate communication with one or more remote communication apparatus. Also included in one embodiment is switching control circuitry that may be integrated with or separate from the communication circuitry. The switching control circuitry operates independently from or in conjunction with the communication circuitry to find the optimal connection to a cable connected to the input/output port of the communication device.

In one configuration the communication device comprises a device operating under any of the DSL family of standards and hence connects to a communication cable using a RJ-11 type connector. One type of DSL is asymmetric DSL. In such configuration, the RJ-11 is generally configured with two or more pairs of twisted pair cabling. In various service installations or configurations, the DSL service is enabled on either of the two or more pairs of twisted pair cabling. Other configurations may enable communication on other than a pair of cables. The automatic configuration capabilities of the invention desirably overcome the confusion and misconnections arising out of the variations in service configurations for services such as DSL.

In operation, a user or other apparatus configured to initiate action enables the communication device for operation. During the initial operation of the device, upon re-connection of the device, or reconfiguration of the communication service, the automatic configuration apparatus of the communication device undergoes an automatic configuration process. To connect to the desired one of the two or more pair of communication cables enabled with the communication service, the switching devices are configured in a first position, referred to as a default position. The default position may be any switch position desired.

In the default position, either the communication circuitry or the switch control circuitry monitors for enablement of the communication services on the communication cable pair that the switch device, in the default position, connects to the communication circuitry. In one configuration either the communication circuitry or the switch control circuitry sends off a tone or signal, or takes other action, such as establishment of an off-hook status, to initiate the communication session and thereafter monitors for enablement of the communication service on the communication cable connected to the communication circuitry by the switch device.

If the communication circuitry and/or the switch control system does not detect enablement on the default communication pair after a period of time, such as a time-out period, the operation initiates a switching operation by the switch device. If the switch device is a relay, the latches of the relay are actuated. The switching operation connects the communication circuitry to an alternate cable set of the two or more communication cable sets connected to the communication device. Thereafter the above described operation repeats as either the communication circuitry or the switch control circuitry monitors for the communication service on the communication cable set selected by the switch.

In an alternative configuration the switch control circuitry initiates and/or monitors for the cable set enabled with the communication circuitry without assistance from the communication circuitry.

In various different embodiments, described below in greater detail, the communication device may be configured with one or more input/output ports. In another embodiment the communication device includes a pass-through cable path with a low-pass filter therein to enable plain old telephone service (POTS) by connection to the communication device.

In yet another embodiment, the communication device is configured with communication circuitry to enable two or more different communication standards. In one such configuration the communication device includes two switching devices, one being associated with each of the different communication standards. Using the principles of operation described herein, each of the switching devices provides automatic configuration to find and connect each communication circuitry to a cable set having the desired communication service enabled thereon.

Further objects, features, and advantages of the invention over the prior art will become apparent from the following detailed description of the attached figures.

DETAILED DESCRIPTION OF THE INVENTION

The invention is a method and apparatus for auto-configuration of a communication device. In the following description, numerous specific details are set forth in order to provide a more thorough description of the invention. It will be apparent, however, to one skilled in the art, that the invention may be practiced without these specific details. In other instances, well-known features have not been described in detail so as not to obscure the invention. It is contemplated that the features described herein may be implemented either alone or in any combination.

Example Environment

Figure 1:
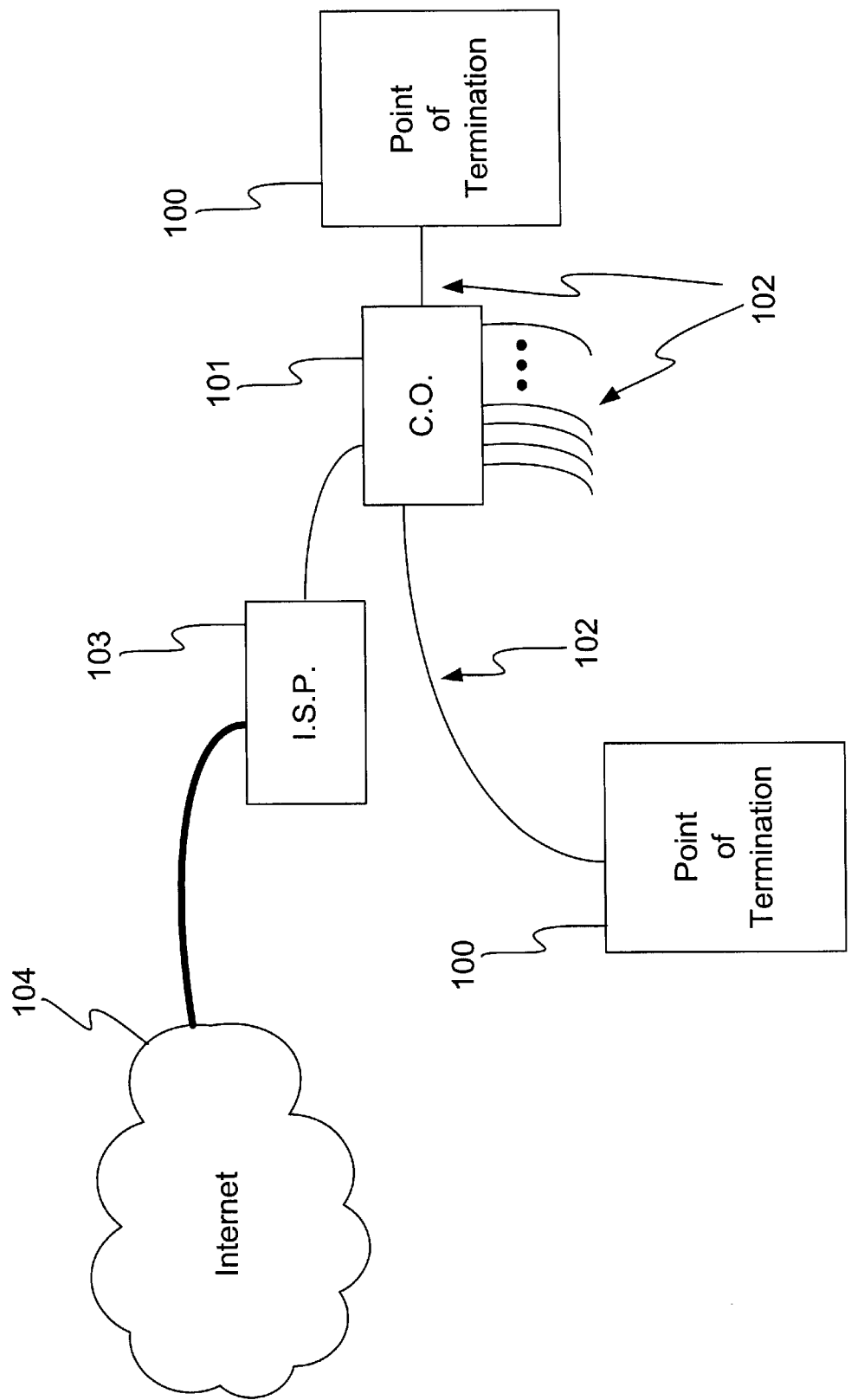
FIG. 1 illustrates block diagram of an example environment of the invention.

In one example environment, the invention facilitates automatic and accurate connection between a communication device, such as a modem, and a worldwide network of computers such as the Internet. FIG. 1, provided for purposes of explanation, illustrates an example environment particularly well suited for use of the invention. As shown, a point of termination 100 often comprises a house or business location desiring access to the Internet. The point of termination connects to a central office (C.O.) 101 via one or more twisted pair conductors known as the local loop 102. The central office includes numerous connections to other users or points of termination. In one configuration, the central office also includes a connection to an Internet service provider (ISP) 103. The ISP 103 comprises data processing and communication equipment to facilitate access to the Internet 104 and includes a plurality of high bandwidth connections to other ISP's and computers thereby forming a portion of the Internet.

Figure 2:
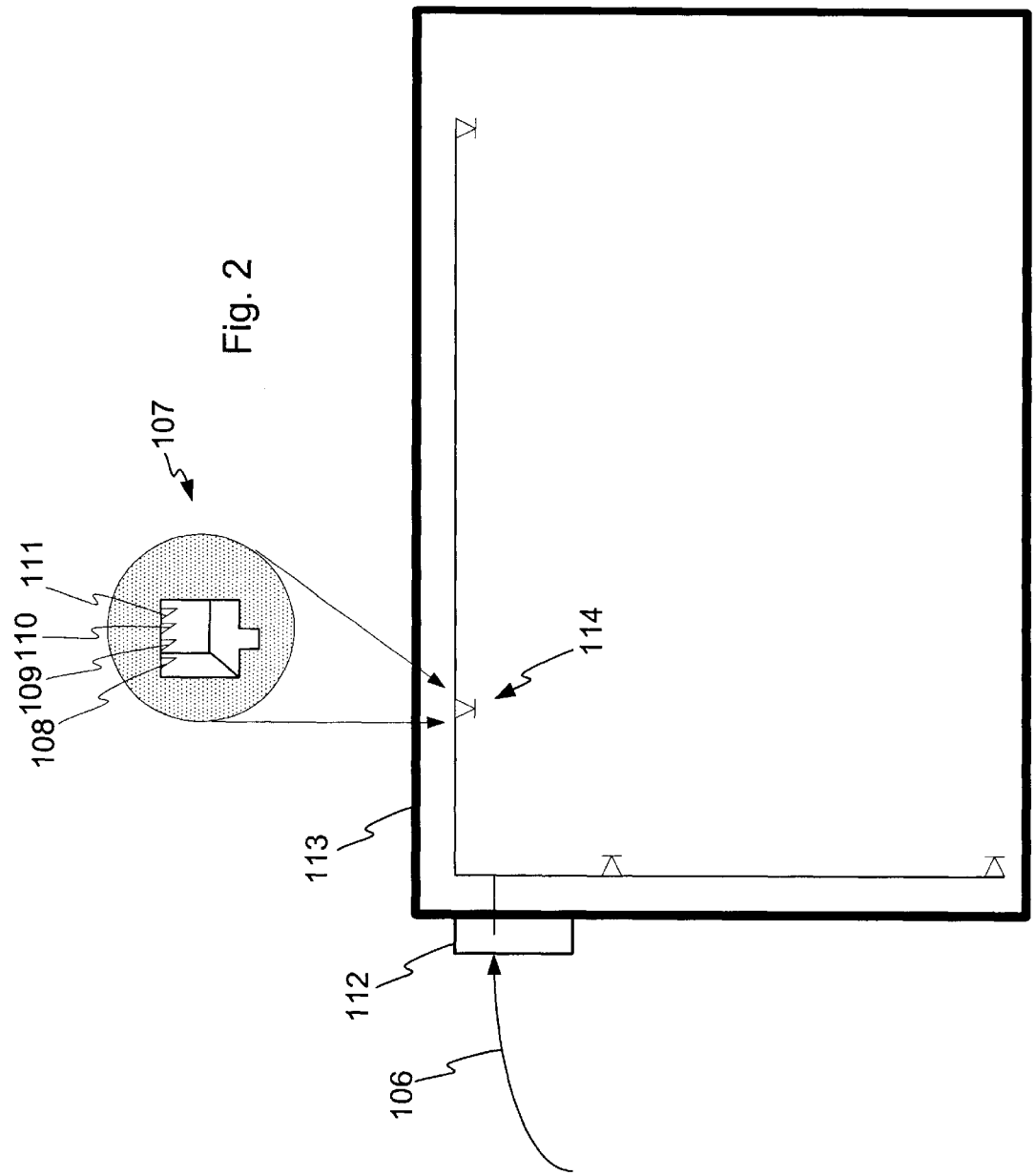
FIG. 2 illustrates exemplary communication cable layout inside a building.

As shown in FIG. 2, the local loop 106 enters the point of termination 112, in this example environment a home or business 113, and connects to one or more jacks or connectors 114. One common form of connection often found within a home or business comprises a RJ-11 connector 107. FIG. 2 illustrates an exemplary four conductor connector with an RJ-11 107 configuration as might be found incorporated in a wall jack of a home or business. Standard telephone voice service, analog modem communication, and DSL communication utilize one pair of the four wire configurations. Although any various configuration can be enabled, most commonly, either of the inner pair 109, 110 or the outer pair 108, 111 is utilized to provide one of the previously mentioned services. It should be noted that this discussion refers to an inner pair and an outer pair as a means to distinguish between two or more conductors and such reference is provided for purposes of understanding. Any conductor(s) or medium capable of carrying a communication signal may be designated the inner pair or inner conductor. Likewise, any conductor(s) or medium capable of carrying a communication signal may be designated the outer pair or outer conductor.

Example Configurations

To address the drawbacks described above in the Background section, the invention successfully adapts to various service configurations as is commonly found in DSL service installations. For purposes of understanding, these configurations are briefly discussed herein. In DSL installations, one or both pairs of wires are used for phone service.

Figure 3:
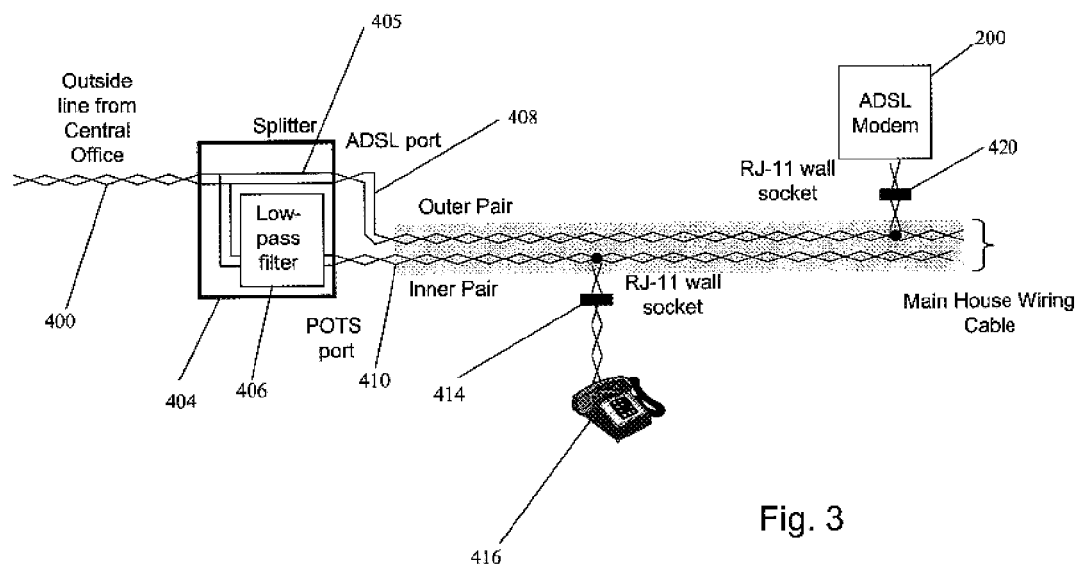
FIG. 3 illustrates a block diagram of a first service configuration comprising a splittered shared line configuration

FIG. 3 illustrates a block diagram of a first service configuration comprising a splittered shared line configuration. As shown, an incoming communication cable 400 connects to a splitter 404. In one configuration the communication cable comprises a twisted pair of lines having an inner pair 410 and an outer pair 408. A splitter is known by those of ordinary skill in the art and accordingly is not described in great detail herein. Internal to the splitter 404, the communication line 400 branches to a low-pass filter 406 and to a shunt 405. A DSL line 408 (outer pair) exits the splitter 404 via the shunt 405 as shown. A POTS line 410 (inner pair) also exits the splinter 404 after having been low pass filtered. Connected to the POTS line (inner pair) is a telephone 416 via a wall socket 414. A DSL communication device 200 connects to the DSL line (outer pair) via a wall socket 420. In one embodiment the DSL line and the POTS line are a single four conductor twisted pair line. In one configuration the DSL line is the outer pair 408 of the four conductor twisted pair. In another configuration the DSL line is the inner pair 410 of the four conductor twisted pair.

From this service configuration it can be seen that the communication device can be connected to either of the outer pair 408 or the inner pair 410.

Figure 4:
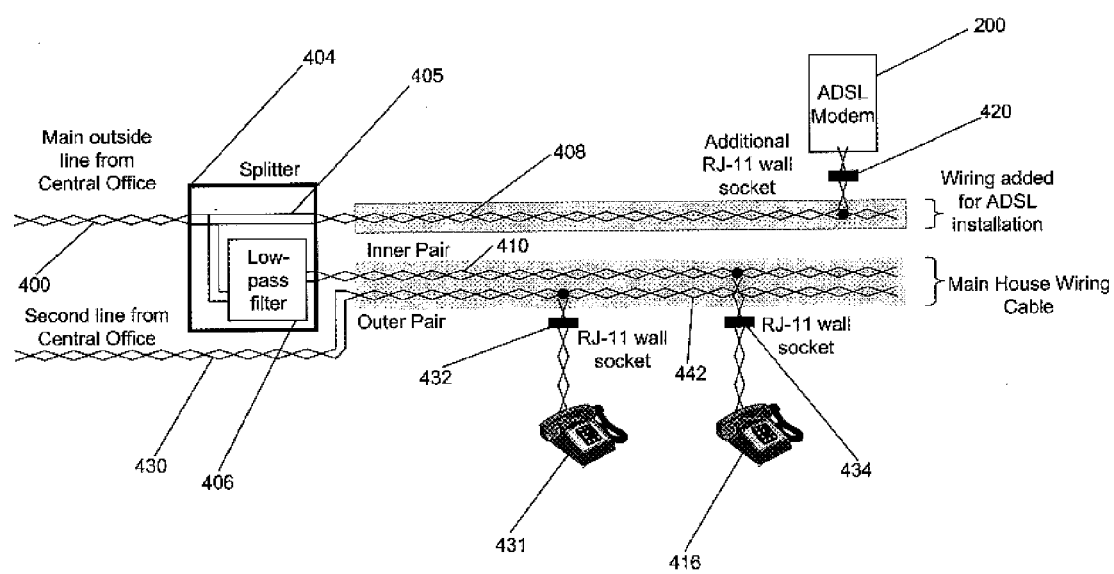
FIG. 4 illustrates a block diagram of a second service configuration comprising a splittered dual line configuration.

FIG. 4 illustrates a second service configuration comprising a splittered dual line configuration. As compared to FIG. 3, like elements are referenced with like reference numerals. In addition to the elements of FIG. 3, FIG. 4 also illustrates a second incoming line 430 having at least an outer pair 442. Connected to the outer pair 442 within a structure is a telephone 431 via a wall socket 432. This configuration arises when the outer pair of the in-building wiring is in use for POTS service, such as when two phone lines are already installed in the building.

In the configuration shown in FIG. 4, the DSL service, as provided from a DSL service provider, can be provided on any of first pair 400 or the second pair 430 as would generally be provided to the structure. In such an arrangement, when the DSL service is provided on line 400, the conductor 408 is added within the structure to provide an additional conductor for the DSL service. Thus, the line 400 supplied to the structure includes POTS service and DSL service. The low-pass filter 406 filters out the DSL service on the line 410. Alternatively, it is contemplated that the DSL service can be provided on any of the lines in the building if the proper filtering arrangement is utilized.

Figure 5:
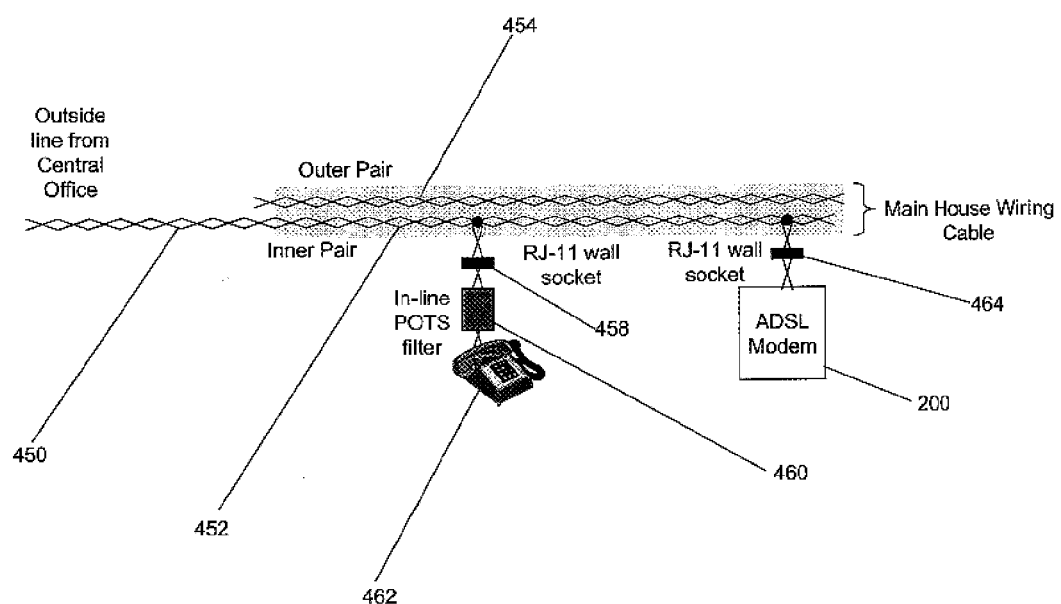
FIG. 5 illustrates a block diagram of a third service configuration comprising a splitterless configuration.

Turning now to FIG. 5, an illustration is provided of a splitterless configuration. As shown, a communication cable 450 having an inner pair 452 and an outer pair 454 connects to a building or other facility. In such a configuration the DSL service may be provided on either of the inner pair 452 or the outer pair 454. As an alternative to the splitterless services, an in-line POTS filter 460 resides anywhere between each telephone 462 and wall socket 458. The in-line POTS filter 460 serves as a low pass filter to eliminate the DSL service found at the higher frequency portion of the communication cable's usable bandwidth as seen by telephone 462. Also connected to the inner pair 452 is a communication device 200 via a wall socket 464. In other embodiments the in-line POTS filter 460, telephone 462 and communication device 200 connect to the outer pair. It is further contemplated that more than one telephone connects to either of the inner pair 452 or outer pair 454 and that the DSL service can be enabled on either of the inner pair 452 or the outer pair 454.

As can be understood under any of the installation configurations shown in FIGS. 3–5, or any other configuration as could be imagined by those of ordinary skill in the art, there are numerous various service configurations to enable a communication standard such as DSL service. For example, the service could be on either of the inner pair or the outer pair. In some embodiments, POTS signals may also reside in the lower frequency bandwidth of the inner or outer pair. The service configurations also vary from one part of the world to another, and even vary from one service provider to another. Thus, one house may be configured in one manner, while the house next door may be configured in another manner.

Advantageously, the invention overcomes the problems associated with providing numerous different devices each configured to operate in a particular one of the number of various service configurations. Another complication arises when the communication device 200 is further configured to include an analog modem, such as for example, a modem operating under the V0.90 standard. Various embodiments of the invention also provide a solution to this service configuration.

One Communication Standard on a Single Communication Device

FIG. 6 illustrates a block diagram of an example embodiment of the invention configured to adapt to the various service configurations described above or that could be encountered by a device. A communication device may comprise any device configured to achieve communication, such as a modem, operating under any analog or digital communication standard. In one embodiment the standard comprises any of the family of DSL services. It is contemplated that the communication device 200 comprises either a device internal to a computer, such as configured to mate with a connector or bus on a motherboard of a computer, a device external to the computer, or an associated device for interface with a personal computing device.

Associated with the communication device 200 is an input/output jack 202. In a preferred embodiment the jack 202 comprises a RJ-11 type connector although any type connector capable of completing an electrical connection is suitable. Two or more conductors 204 connect to the jack 202. For purpose of discussion, four conductors are shown. In this example embodiment the two or more conductors comprise an inner pair 208 and an outer pair 206 as is often configured for telephone service within buildings in the United States. The inner pair 208 and the outer pair 206 terminate at a relay 210.

The output from the relay 210 comprises a dual conductor pair of feed lines 212, both of which connect to a communication circuitry 214. The communication circuitry 214 may comprise any form of circuitry configured to facilitate communication with a remote communication device. In one embodiment the communication circuitry 214 operates under the standards of DSL technology.

In this exemplary embodiment the relay 210 comprises a double pole, double throw magnetic latching relay with associated control circuitry. In this embodiment the relay includes a four terminal by two terminal configuration. Between the input terminals O1, I1, I2, O2 and output terminals are control magnets 220 connected to associated relay control circuitry 222. Advantageously, a magnetic latching relay may be utilized to allow the bus structure, such as for example a PC-PCI bus structure, to power down while the relay remains in the desired relay state.

As is understood, these types of relays have two or more coils each of which are pulsed for operation to thereby generate a magnetic field. A pulse on one coil 220 will "latch open" a contact 230 while a pulse on a second coil will "latch close" the same contact. In one exemplary relay embodiment the pulse duration comprises a pulse of 100 msec or greater. Although the coils are able to operate in a continuously powered state, a preferred manner of operation powers down the coils after pulse operation.

The relay control circuitry 222 operates in conjunction with the communication circuitry 214 to oversee connections within the first relay 220. Hence, via signals from the relay control circuitry 222, the coils 220 actuate the top latch 230 and the bottom latch 232 into any possible position. Thus, it is fully contemplated that independent of the position of the bottom latch 232, the top latch 230 can assume a connection to conductor O1 or I1. Likewise, regardless of the position of the top latch 230, the bottom latch 232 can assume a connection to conductor I2 or O2. In this manner the signal carried on conductors 204 can be provided to communication device 214.

Figure 6A:
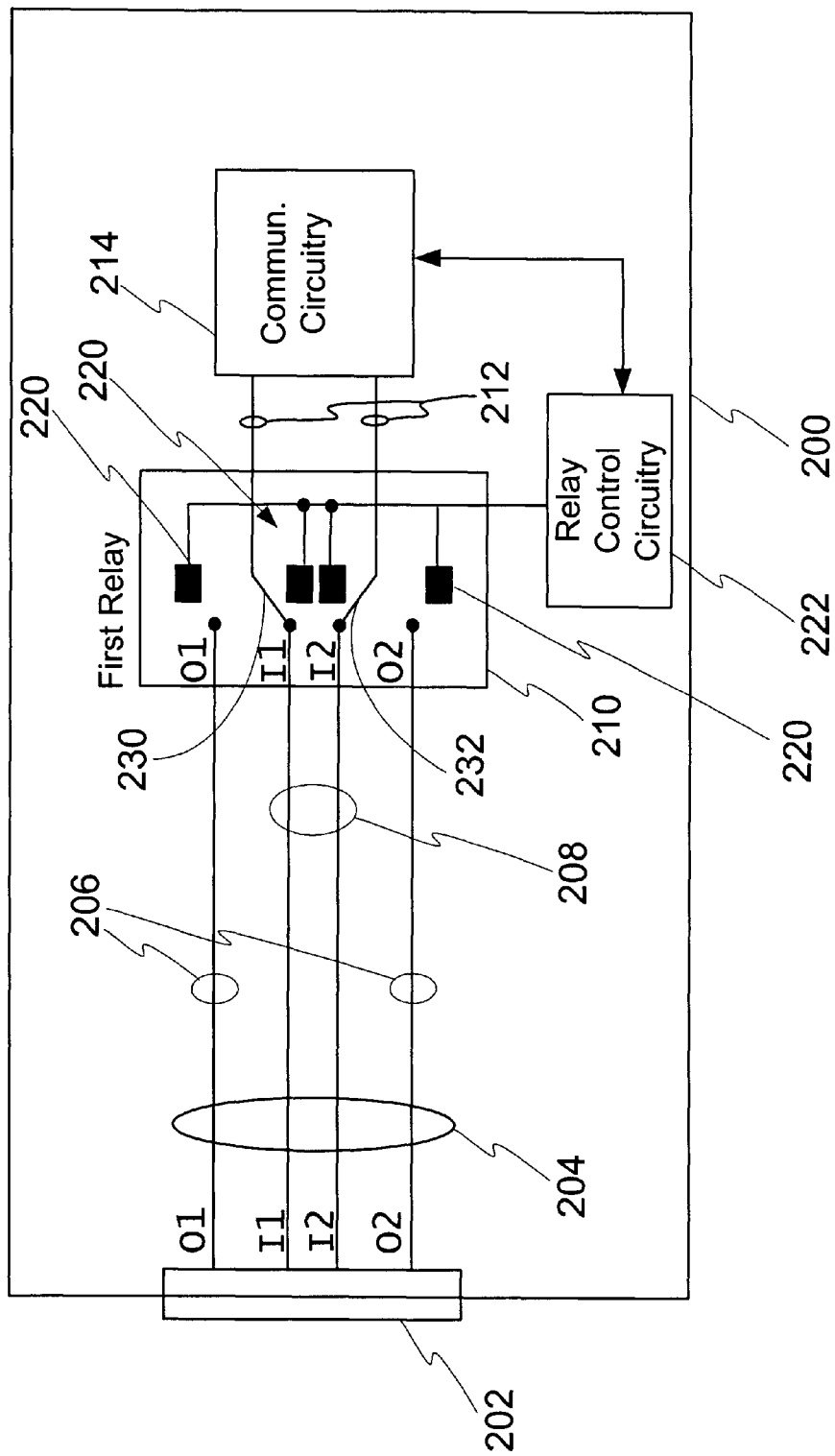
FIG. 6A illustrates a block diagram of an example embodiment of the invention configured to adapt to various service configurations.
Figure 6B:
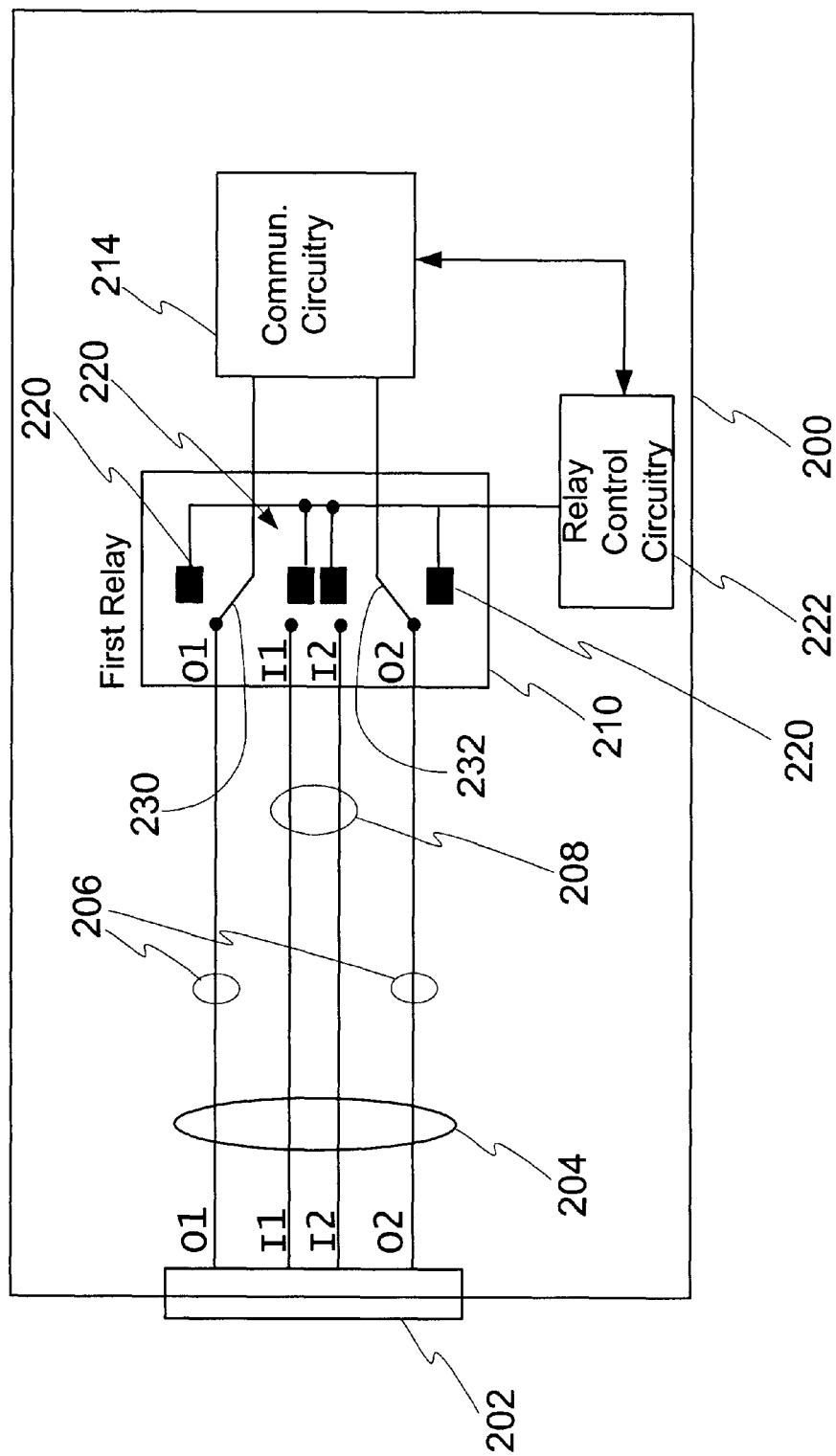
FIG. 6B illustrates a block diagram of an example embodiment of the invention as shown in FIG. 6A configured in an alternative connection position.

As shown in FIG. 6A, the latches 230, 232 are positioned on the inner conductor pair 208 as a default state thereby providing the signal on the inner pair to the communication circuitry 214. In one embodiment, the default location for latches 230, 232 is on the inner pair. In contrast, FIG. 6B illustrates a communication device 200 having relay 210 with latches 230, 232 positioned on the outer conductor pair 206 thereby providing the signal on the outer pair to the communication circuitry 214. The detailed operation of the device 200 is described below in greater detail.

Figure 7:
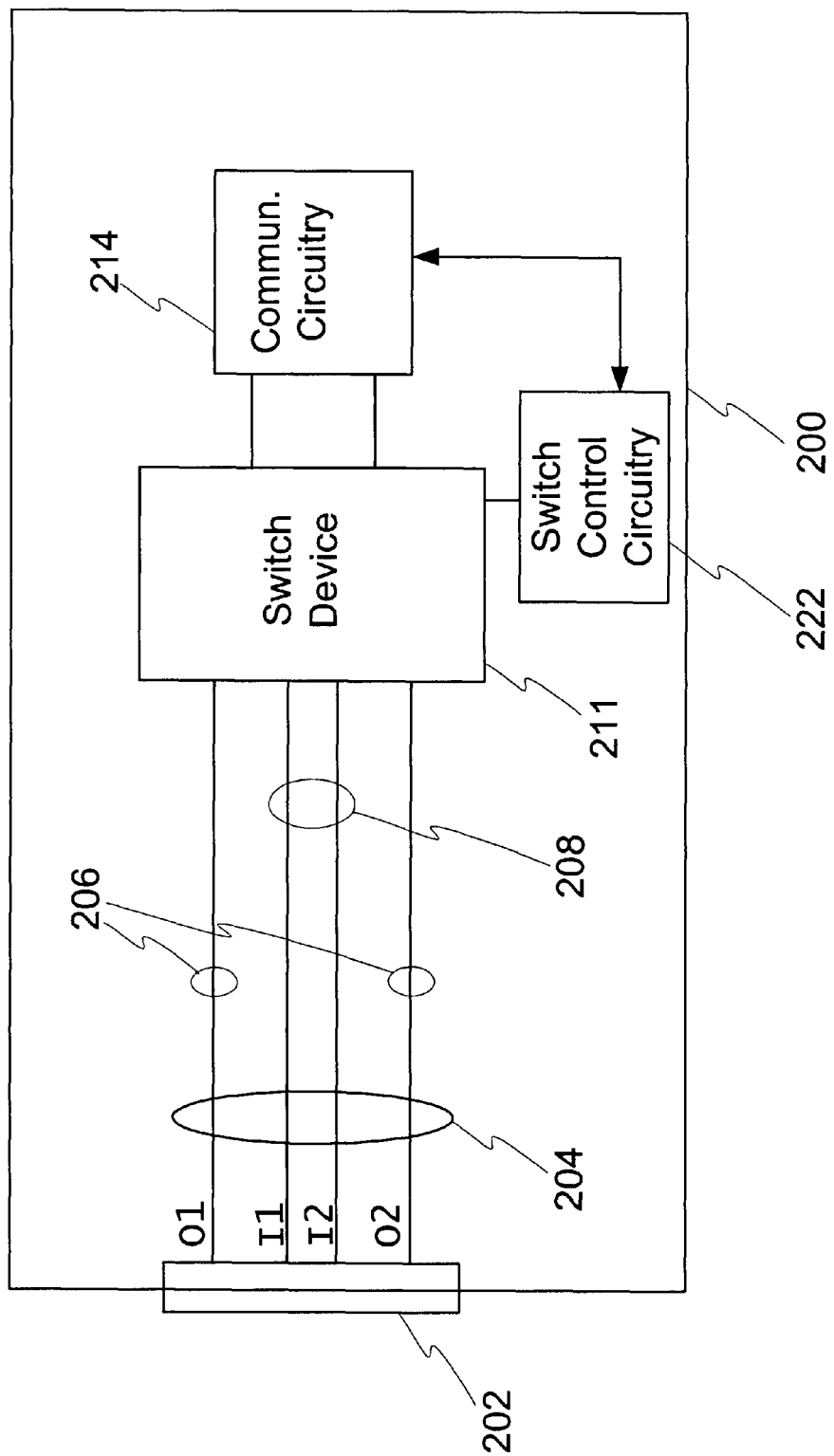
FIG. 7 illustrates a block diagram of an alternative embodiment of the invention having an alternative switching device.

FIG. 7 illustrates a block diagram of a communication device 200 with automatic configuration capability achieved by a switch device 211 instead of relay 210. It is contemplated that the switch device 211 may comprise any switching apparatus capable of selectively connecting any two lines of lines 204 to the communication circuitry 214. In one example embodiment, the switch device 211 comprises electronic switches such as an FET (field effect transistor) analog switch, or switch fabric to achieve selective connections as desired. In other embodiments, the switching device may comprise discrete FET devices and circuitry, integrated FET analog switches or crossbar switches and integrated FET opto-isolator switches.

Figure 8:
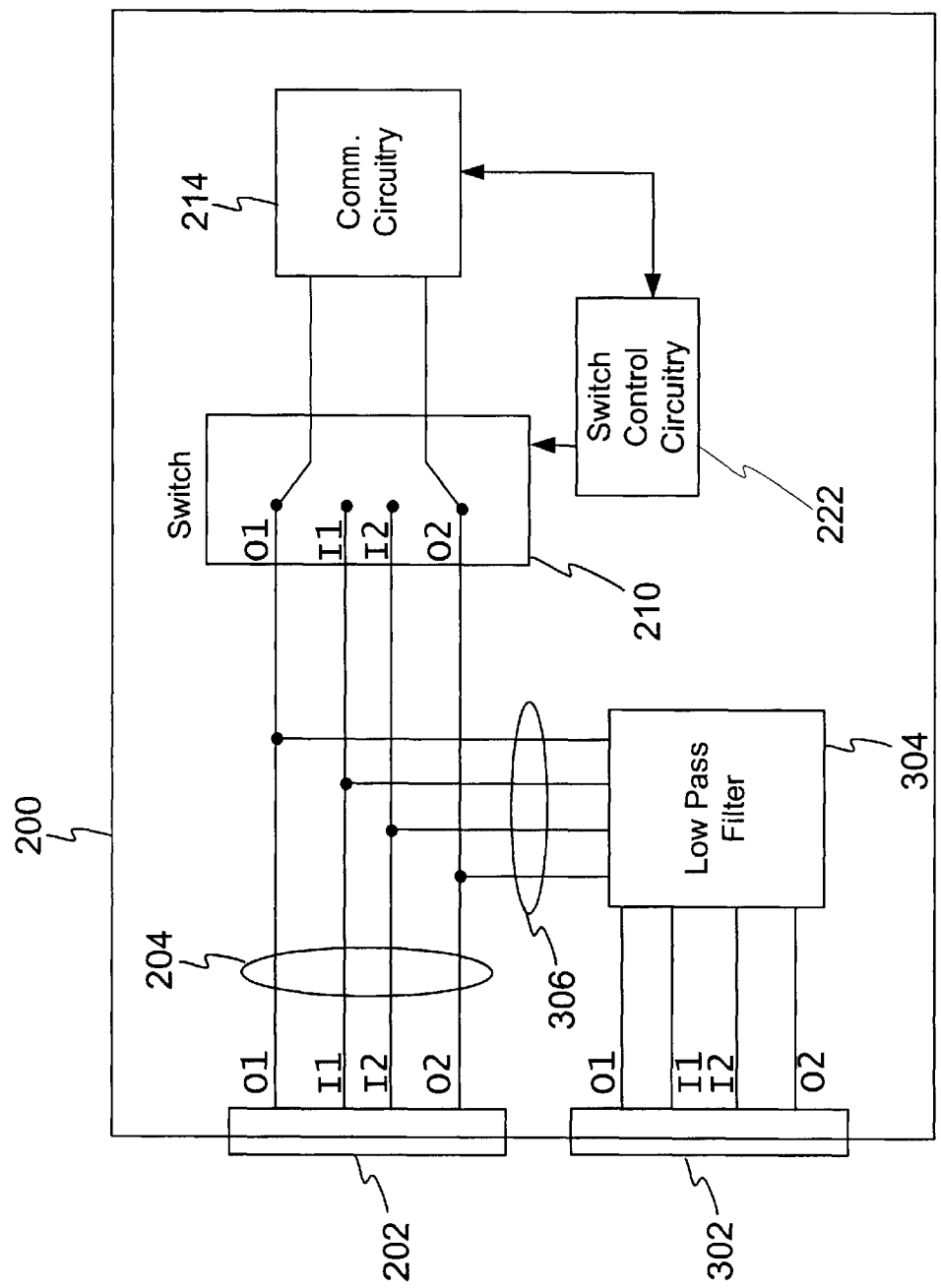
FIG. 8 illustrates a block diagram of an example embodiment of the invention as shown in FIG. 6 configured with a pass-through telephone jack.

In an alternative embodiment, a pass-through telephone connector resides on the communication device 200. FIG. 8 illustrates a block diagram of a communication device 200 having automatic configuration capability and a pass-through telephone jack 302. To achieve the pass-through jack 302, tap lines 306 connect to conductors 204 as shown. A low pass filter 304 resides between the conductors 204 and the pass-through telephone jack 302. The low pass filter 304 removes any high frequency signal components on the pass-through lines 306 that might otherwise interfere with operation of a telephone connected to jack 302. Thus, a user of device 200 may connect a line having a computer-based communication service into terminal or jack 202 to achieve data communication and connect a voice-based communication device, such as a telephone, to terminal or jack 302. In this embodiment, the telephone connected to jack 302 is able to operate simultaneously with communication circuitry 214 if communication circuitry 214 is operating under the DSL standard, because the DSL standard utilizes the frequency bands above the voice band for operation. Therefore, the lower frequency channel is available for voice communication.

The automatic configuration method and apparatus of the invention is also fully compatible with the various other versions of DSL. One such variation comprises G.lite, a power managed version of DSL. G.lite is designed to include a power-down mode that stops communication to save power at both the DSLAM (digital subscriber line access multiplexer) and the CPE (customer premise equipment) devices. To resume operation, the DSLAM or CPE sends a tone or signal on the communication line. Therefore, the automatic configuration systems described herein are desirably configured to maintain the configuration of the switching devices to insure reception of the activation tone by the communication circuitry of the CPE device. In one embodiment configured to operate under the G.lite communication standard, the default position of the switch device is in connection with the inner pair of cables (inner cable set) as the most common G.lite service configuration is on the inner pair or cable set. To maintain switch position, power is continually provided to the switch device regardless of the G.lite state. Alternatively, magnetic latching relays may be utilized.

Two Communication Standards on a Single Communication Device

Figure 9:
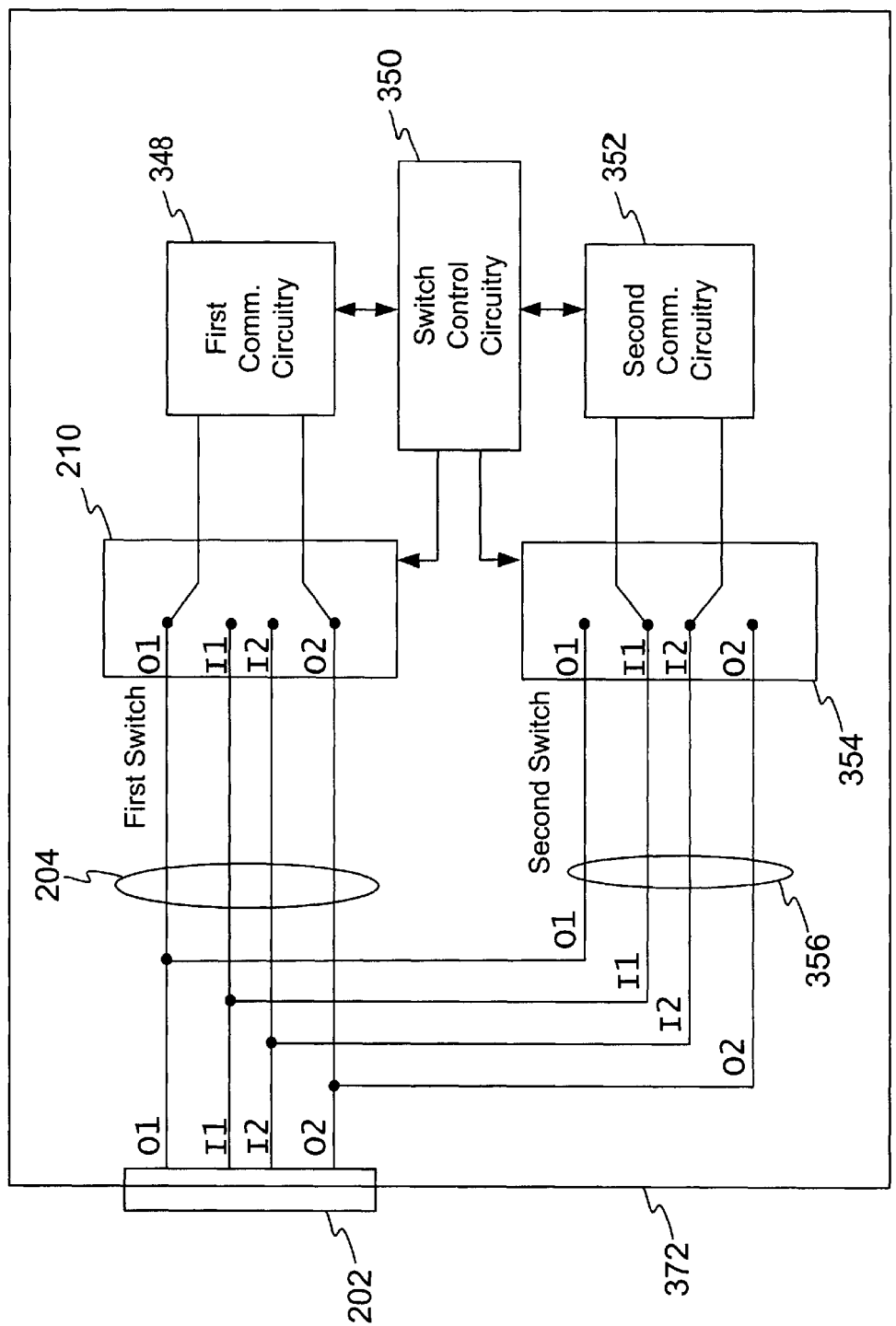
FIG. 9 illustrates a block diagram of an alternative embodiment having circuitry to support more than one communication standard.

In an alternative embodiment more than one communication standard is enabled on a single communication device. FIG. 9 illustrates an alternative embodiment having greater circuitry to support more than one communication standard on a single device 372. As shown, an input/output jack 202 connects to two or more conductors 204. In this example embodiment there are four conductors 204. The conductors 204 feed into a first switch 210, in a manner described above. The first switch 210 operates in a manner described above.

The first switch 210 output connects to a first communication circuitry 348. The first communication circuitry may be any type of communication circuitry configured to facilitate communication between a remotely located device over a communication medium. In one embodiment the first communication circuitry 348 is configured to operate under any of the DSL standards.

Secondary conductors 356 connect to conductors 204 as shown to maintain isolation of each of the four conductors. The conductors 204, 356 may also be characterized as an inner pair I1, I2 and outer pair O1, O2. A second switch 354 connects to the secondary conductors. In one embodiment the second switch 354 is generally similar to the first switch 210, both of which are described above in greater detail. A second communication circuitry 352 connects to the second switch 354. Second communication circuitry 352 comprises any type of communication circuitry configured to facilitate communication between a remotely located device over a communication medium. In one embodiment the communication circuitry 348 is configured to operate as an analog modem system, such as under the V0.90 standard.

Switch control circuitry 350 connects to both of the first communication circuitry 348 and the second communication circuitry 352 and to each of the first switch 210 and the second switch 354. The switch control circuitry comprises circuitry configured to interact with the systems 210, 348, 354, 352. Such interaction includes receiving information from the first communication circuitry 348 regarding receipt of signals via switch 210 to control the latching mechanisms of switch 210 to connect to either of the inner pair I1, I2 or the outer pair O1, O2 in a manner described herein. Similarly, the switch control circuitry 350 also receives information from the second communication circuitry 352 regarding receipt of signals via switch 354 to control the latching mechanisms of switch 354 to connect to either of the inner pair I1, I2 or the outer pair O1, O2 in a manner described herein. In one embodiment, the switch control circuitry 350 detects a dial tone or presence of tip/ring voltage on either of the inner pair I1, I2 or the outer pair O1, O2. Thus, a dual standard communication device 372 advantageously uses automatic configuration to utilize the communication line having the communication service enabled thereon.

Figure 10:
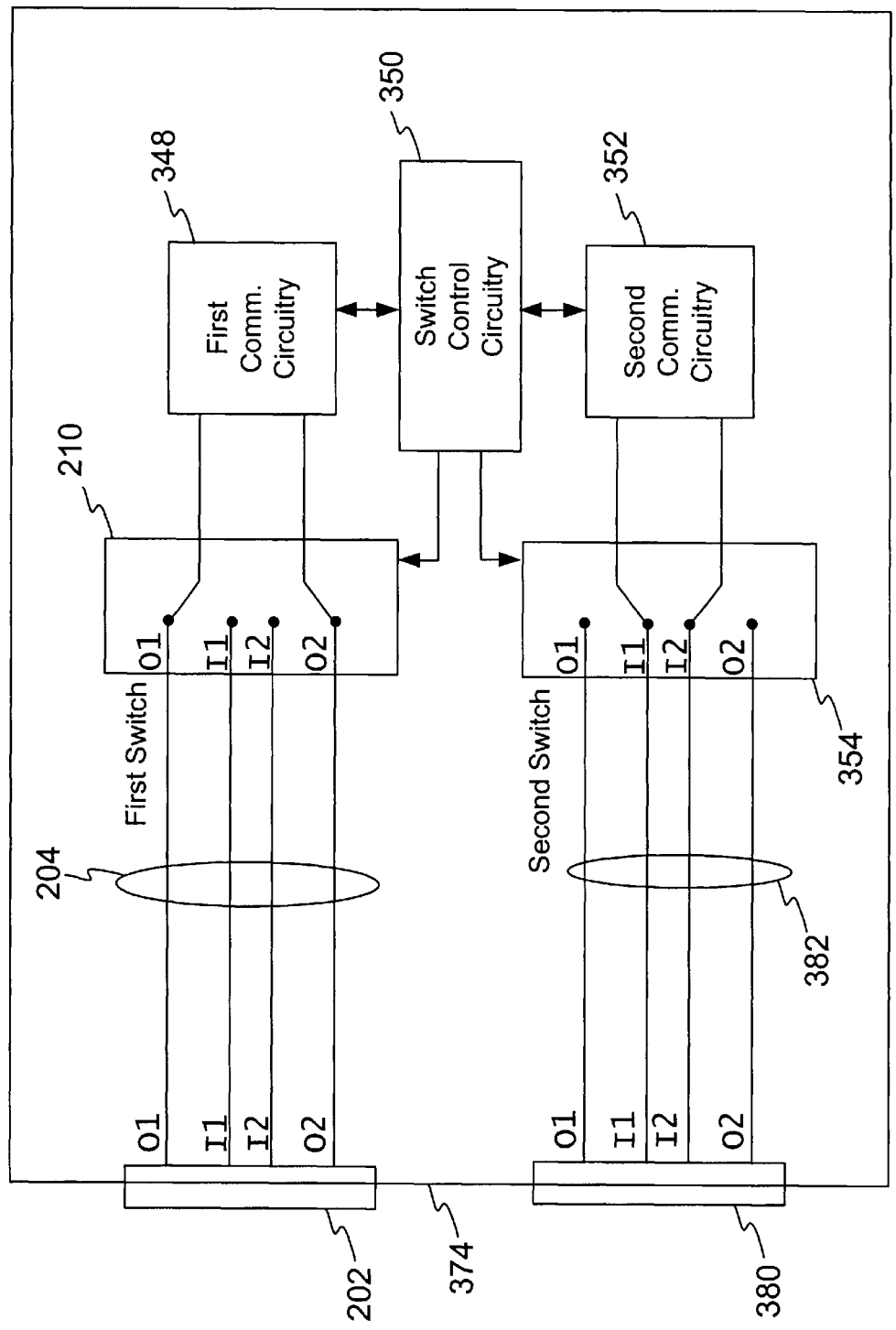
FIG. 10 illustrates a block diagram of an alternative embodiment of the invention having two communication jacks.

FIG. 10 illustrates yet another embodiment of a two standard communication device 374 having two communication jacks 202, 380. Operation is generally similar to the device of FIG. 9. Input occurs through either or both of connectors or jacks 202, 380 and is conducted to switches 210, 354 via lines 204, 382. The switch control circuitry thereafter controls the first switch 210 and the second switch 354 to connect the lines having the communication service to the appropriate communication circuitry 348, 352. It is contemplated that any of these devices may utilize any switching device known by those of ordinary skill in the art to achieve the invention described herein.

Single Input/Output Connector/Single Communication Circuitry

Figure 11:
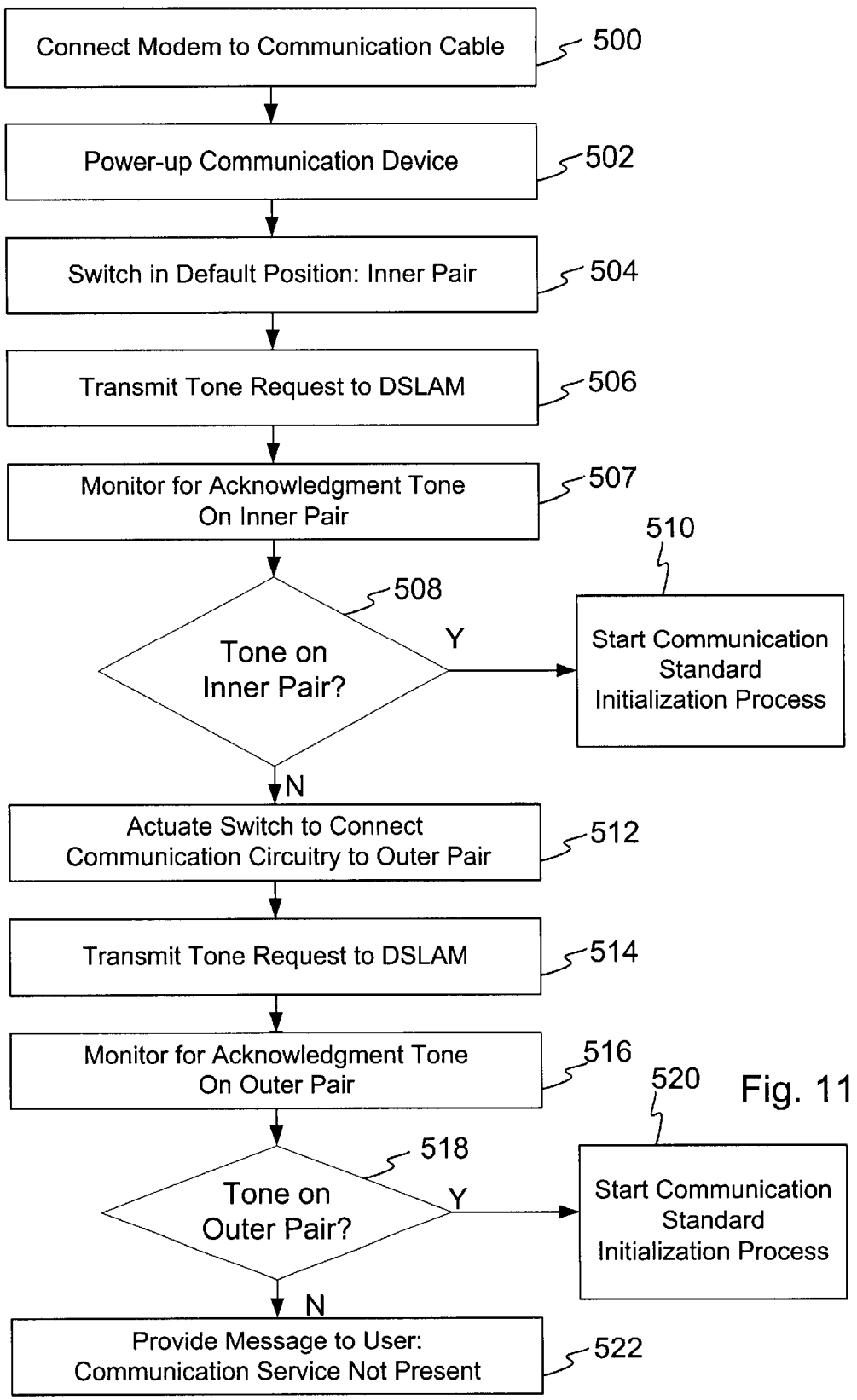
FIG. 11 illustrates an operational flow diagram of an exemplary method of operation of a communication device with communication circuitry to support a single communication standard.

FIG. 11 illustrates an operational flow diagram of an exemplary method of operation of a communication device with single communication circuitry. It should be understood that this is but one possible method of operation. The invention is not limited to this particular method of operation. Further, the steps described herein may be utilized alone or in combination as would be understood by those of ordinary skill in the art.

At a step 500 a user connects the communication device to a communication cable. In one embodiment this comprises plugging a four-conductor telephone cable into one of the connectors or jacks on the communication device. Next, at a step 502, power is provided to the communication device. In one configuration this comprises providing power to a bus into which the communication device is connected or actuating a power switch on the communication device.

At a step 504 it is assumed the switches are in the default position. If not in the default position, at least at the time of first use, the switches are set to their default position.

Thereafter, the communication device initiates the automatic configuration process by, at a step 506, transmitting over the default pair (inner pair) a tone request or other similar request to the DSLAM equipment at the central office. The tone request comprises a signal from the CPE to other remote communication apparatus to request initiation of a communication session. At a step 507 the communication device monitors for an acknowledgment tone on the inner pair that is customarily sent in response to the tone transmitted, in step 506, by the CPE or other communication apparatus at a remote location. The acknowledgment tone comprises a signal sent from a remote location in response to the tone request.

Next, at step 508 the operation determines if it has received a tone on the to default pair (inner pair) within a time-out period. In one example embodiment the time-out period comprises 10 milliseconds to 1 second. If the step 508 determines that the acknowledgment has been received on the inner pair then the latch position is in the correct position and the operation progresses to a step 510. In the step 510 the operation begins an initialization process associated with the particular communication standard enabled on the default pair, in this example the inner pair.

Alternatively, if at step 508 the operation determines that an acknowledgment has not been received on the inner pair within the time-out period, then the operation progresses to a step 512 where the switch control circuitry actuates the switches to connect to a non-default position. In this example, the non-default position comprises a connection to the outer pair as shown in FIG. 6B. Thereafter, at a step 514 the communication device, now being connected to the outer pair, transmits a tone request to the DSLAM or other remote communication apparatus to attempt to initiate a communication session. In alternative embodiments a signal other than a tone request can be sent.

At a step 516, the operation monitors for an acknowledgment tone on the outer pair that would be sent from the DSLAM or other remote communication apparatus in response to the tone request from step 514. At step 518, the process determines if to the acknowledgment tone was received within the time-out period. If an acknowledgment tone was received within the time-out period, the operation progresses to a step 520 and the communication device initiates the communication session as is known in the art.

In the alternative, if an acknowledgment signal was not received within the time-out period, then various reasons may exist for the failure of the communication device and remote communication apparatus to establish a communication link. These reasons include but are not limited to lack of service on the line, malfunction of the communication device or the remote communication apparatus, and poor channel quality. At a step 522, the operation may optionally provide a message to the user that the communication service is not on either of the inner or outer pair.

In alternative embodiments the automatic configuration system may continue the process described in steps 512–518 any number of times to thereby integrate any number of cable sets. A cable set may be any number of conductors. Similarly, the operation is not limited to integration of a 'pair' of lines. It may utilize any of a single or plurality of lines during each of the one or more connection processes.

Single Input/Output Connector/Dual Communication Circuitry

Figure 12:
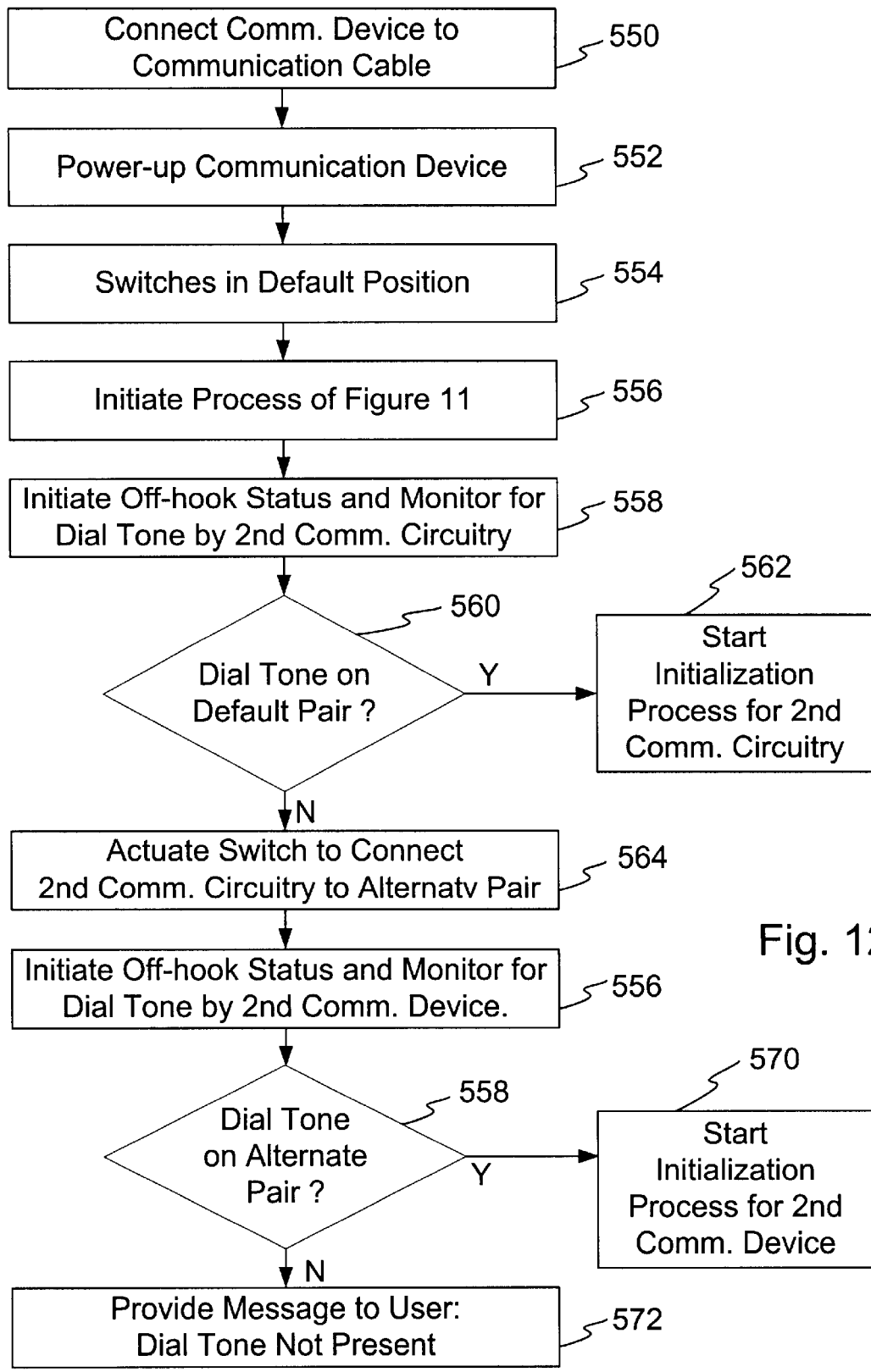
FIG. 12 illustrates an operational flow diagram of an exemplary method of operation of a communication device with communication circuitry to support more than one communication standard.

Turning now to FIG. 12, an alternative method of operation is shown in the operation flow diagram for a device having two communication standards thereon, such as for example shown in FIG. 9 or 10. In this example method of operation, it is assumed for the purposes of discussion and understanding the second communication circuitry is configured differently than the first communication circuitry and that the second communication circuitry operates in conjunction with an analog-based communication standard, such as for example the V0.90 standard. Other configurations are contemplated. At a step 550, step 552 and step 554, it is assumed that the operation of FIG. 12 is generally similar to the operation of steps 500, 502, and 504. However, in this example method of operation there are two switches, namely a first switch and a second switch. The second switch is associated with the second communication circuitry. At a step 554, it is assumed that the latches of both switches are in a desired default position. Next, at a step 556, the operation may optionally enact the automatic configuration procedure provided in FIG. 11. It is fully contemplated that either or both of the automatic configuration procedures undertaken the first switch and the second switch may occur simultaneously or individually. Next, at a step 558, the second communication circuitry initiates an off-hook status and monitors an off-hook detector output for presence of tip and ring voltage, or may monitor for a tone on the default pair connected to the second communication circuitry. The tone may comprise a dial tone, fast busy signal or other signal indicating POTS service is enabled on the line.

After monitoring for a tone, the operation progresses to step 560 wherein the operation determines if a tone was detected within the time-out period. In one embodiment the time out period comprises 10 milliseconds to 1 second. If a tone is detected then the operation progresses to a step 562 wherein the second communication circuitry begins the initialization process.

Alternatively, if the operation does not detect a tone at step 560, then the operation progresses to a step 564. At step 564 the switch control circuitry, being in communication with the second communication circuitry, actuates the latches of the second switch to cause the second switch latch to an alternate pair of communication lines.

After changing the connection to the alternate pair of communication lines the operation repeats the process at a step 566 and a step 568 by first initiating an off-hook condition and monitoring for tone on the second communication device and secondly determining if a tone was detected within the time-out period.

If a tone was detected, the operation progresses to a step 570 and the second communication circuitry initiates the communication session. In the alternative, if the second communication does not detect tone, the system, at a step 572, provides the user with a message that tone is not present.

As with the previous method of operation, the automatic configuration system continues the process described in steps 560–572 any number of times to thereby integrate any number of pairs of lines. Similarly, the operation is not limited to integration of a 'pair' of lines. It may utilize any of a single or plurality of lines during each of the one or more connection processes.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A communication device comprising a modem having automatic port configuration to thereby connect the modem to a communication cable configured for data communication via a first communication standard, the communication device comprising:

at least one port, said port being configured to connect to two or more communication cables to facilitate transfer of data to or from the communication device, wherein at least one of said two or more communication cables is configured for data communication via said first communication standard and at least one of said two or more communication cables is configured for data communication via a second communication standard;

communication circuitry on the communication device to facilitate data communication with a remote location and to detect a signal on a communication cable, the detection of the signal indicative that the communication cable is configured for data communication via said first communication standard;

a switching device between the at least one port and the communication circuitry; and a switching device controller in communication with the switching device and the communication circuitry, the switching device controller configured to control the switching device to selectively connect the communication circuitry to said at least one of said two or more communication cables that is configured for data communication via said first communication standard.

2. The device of claim 1, wherein the communication cables comprises two pairs of twisted pair wires.

3. The device of claim 1, wherein the communication circuitry is configured to operate in accordance with the ADSL communication standard.

4. The device of claim 1, wherein the switching device comprises a relay.

5. The device of claim 1, wherein the at least one port comprises a RJ-11 port.

6. The device of claim 1, wherein selectively connect comprises connect to one of the two or more communication cables coupled to the at least one port.

7. A connection configuration device adapted to reside between at least one communication cable set and communication circuitry, the configuration device comprising:

a switching device having:

two or more inputs configured to connect to two or more cable sets, wherein one of said two or more cable sets is configured to communicate via a first communication standard and at least one of said one or more cable sets is configured to communicate via a second communication standard:
one or more outputs configured to connect to communication circuitry;
a switch configured to establish a connection between either of the two or more inputs and the one or more outputs; and
a switching device controller in communication with the switching device to selectively control the operation of the switch, said switching device controller in communication with said communication circuitry to monitor for a signal on the two or more cable sets indicating said one of said two or more cable sets configured to communicate via said first communication standard to thereby connect the communication circuitry to said one of said two or more cable sets configured to communicate via said first communication standard as indicated by said signal.

8. The connection configuration device of claim 7, wherein the switching device comprises a semiconductor device.

9. The connection configuration device of claim 7, wherein a cable set comprises a twisted pair.

10. The connection configuration device of claim 7, wherein the communication circuitry is configured to operate under the ADSL communication standard.

11. The connection configuration device of claim 7, further comprising:
a second communication circuitry; and
a second switch device connected to one or more cable sets, wherein said second switch device connects the communication circuitry to one of the one or more cable sets.

12. A method for automatic configuration of connections between a communication circuitry and two or more communication cable sets in a communication device during initial establishment of a communication service via a first communication standard, the method comprising:
initiating operation of a communication service via said first communication standard on a first communication cable set or a second communication cable set, wherein either said first communication cable set is configured for said first communication standard and said second communication cable set is configured for a second communication standard or said second communication cable set is configured for said first communication standard and said first communication cable set is configured for said second communication standard;
connecting the communication circuitry to the first communication cable set during establishment of a communication service;
monitoring for enablement of the communication service via said first communication standard on the first cable set to determine if the communication service via said first communication standard was established on the first cable set; and
if said monitoring does not reveal enablement of the communication service via said first communication standard on the first cable set, connecting the communication circuitry to a second communication cable set.

13. The method of claim 12, further including monitoring for enablement of the communication service via said first communication standard on the second cable set.

14. The method of claim 13, further including providing notification if said monitoring for enablement of the communication service via said first communication standard on either of the first cable set or second cable set does not detect the operation of the communication service via said first communication standard.

15. The method of claim 12, wherein the communication service via said first communication standard comprises G.lite DSL service on a cable set.

16. The method of claim 12, wherein connecting comprises activating a switching device to change the connection with the first cable set to a second cable set.

17. The method of claim 12, wherein said first cable set comprises a twisted pair of conductors.

18. The method of claim 12, wherein said communication circuitry comprises circuitry configured to operate under the digital subscriber line communication standard.

19. A method for automatic configuration of connections between communication circuitry and two or more communication cable sets to achieve communication between the communication circuitry and a remote location, the method comprising:
connecting the communication circuitry to a first communication cable set, said connecting occurring through a switching device;
transmitting a signal to said remote location to initiate communication with the remote location using the first communication set;
monitoring for a response from said remote location to said transmitting a signal over the first communication set; and
switching said switching device to connect the communication circuitry to achieve connection to an alternate communication cable set if said monitoring does not detect a response from said remote location, wherein only one of the two or more communication cable sets is designated for communication using the communication circuitry.

20. The method of claim 19, wherein connecting the communication circuitry to a first communication cable set comprises maintaining said switching device in a default position.

21. The method of claim 19, wherein transmitting a signal to said remote location comprises transmitting a tone request signal to said remote location.

22. The method of claim 19, wherein monitoring for a response comprises monitoring for an acknowledgment request.

23. The method of claim 19, wherein said remote location comprises a DSLAM.

24. The method of claim 19, wherein switching said switching device comprises actuating latches in a relay.

25. The method of claim 19, wherein one of said communication cable set comprises copper twisted pair conductors.

26. The method of claim 19, wherein said communication circuitry comprises circuitry configured to operate under the digital subscriber line communication standard.

27. An apparatus for automatic configuration of a DSL communication device comprising:
means for connecting communication circuitry to a first communication cable:
means for initiating a communication session with a remote communication device over said first communication cable;
means for monitoring for a response from said remote communication device: and means for changing the connection within said means for connecting of said communication circuitry from said first communication cable to a second communication cable if said means for monitoring does not detect a response from said remote communication device, wherein only one of the first communication cable and the second communication cable are configured to operate under a DSL communication standard.

28. The apparatus of claim 27, wherein the means for connecting comprises a relay.

29. The apparatus of claim 27, wherein the means for changing comprises switching device control circuitry.

30. An apparatus for automatic configuration of a communication port comprising:

a switch configured to couple to at least one of one or more communication cables through said communication port wherein at least one or more of said one or more communication cables is not configured for data communication and at least one of said one or more communication cables is configured for data communication;

communication circuitry for initiating a communication session with a remote communication device over said one or more communication cables;

a monitoring apparatus coupled to said switch to monitor for a response from said remote communication device, said response indicating that said communication port is coupled to a communication cable that is configured for data communication; and a switch control device in communication with said monitoring apparatus for changing the connection within said switch to connect said communication circuitry to a communication cable that is configured for data communication.

31. The apparatus of claim 30, wherein the switch comprises a field effect transistor.

32. The apparatus of claim 30, wherein the communication circuitry, monitoring apparatus, and the switch control device are on a single integrated circuit.

* * * * *